US010175483B2

(12) United States Patent
Salter et al.

(10) Patent No.: US 10,175,483 B2
(45) Date of Patent: Jan. 8, 2019

(54) HYBRID WORLD/BODY LOCKED HUD ON AN HMD

(71) Applicant: Microsoft Technology Licensing, LLC, Redmond, WA (US)

(72) Inventors: Tom G. Salter, Seattle, WA (US); Ben J. Sugden, Woodinville, WA (US); Daniel Deptford, Redmond, WA (US); Robert L. Crocco, Jr., Seattle, WA (US); Brian E. Keane, Bellevue, WA (US); Laura K. Massey, Redmond, WA (US); Alex Aben-Athar Kipman, Redmond, WA (US); Peter Tobias Kinnebrew, Seattle, WA (US); Nicholas Ferianc Kamuda, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/921,116

(22) Filed: Jun. 18, 2013

(65) Prior Publication Data
US 2014/0368535 A1 Dec. 18, 2014

(51) Int. Cl.
*G06T 19/00* (2011.01)
*G02B 27/01* (2006.01)
(Continued)

(52) U.S. Cl.
CPC ............ *G02B 27/017* (2013.01); *G06F 3/011* (2013.01); *G06F 3/012* (2013.01); *G06T 11/60* (2013.01);
(Continued)

(58) Field of Classification Search
CPC . G06T 19/006; G06T 11/60; H04N 2213/008; G02B 27/017
(Continued)

(56) References Cited

U.S. PATENT DOCUMENTS 5,767,820 A 6/1998 Bassett et al.
6,396,497 B1 5/2002 Reichlen
(Continued)

FOREIGN PATENT DOCUMENTS

CN 1497244 A 5/2004

OTHER PUBLICATIONS

W. Piekarski, "Augmented Reality Working Planes: a foundation for action and construction at a distance", IEEE and ACM International Symposium on Mixed and Augmented Reality, ISMAR 2004, Nov. 2-5, 2004, p. 162-171.*
(Continued)

*Primary Examiner* — Jin-Cheng Wang
(74) *Attorney, Agent, or Firm* — Arent Fox LLP

(57) ABSTRACT

A system and method are disclosed for displaying virtual objects in a mixed reality environment in a way that is optimal and most comfortable for a user to interact with the virtual objects. When a user is not focused on the virtual object, which may be a heads-up display, or HUD, the HUD may remain body locked to the user. As such, the user may explore and interact with a mixed reality environment presented by the head mounted display device without interference from the HUD. When a user wishes to view and/or interact with the HUD, the user may look at the HUD. At this point, the HUD may change from a body locked virtual object to a world locked virtual object. The user is then able to view and interact with the HUD from different positions and perspectives of the HUD.

25 Claims, 12 Drawing Sheets

(51) Int. Cl.
*G06T 11/60* (2006.01)
*G06F 3/01* (2006.01)

(52) U.S. Cl.
CPC ...... *G06T 19/006* (2013.01); *G02B 2027/014* (2013.01); *G02B 2027/0178* (2013.01); *G02B 2027/0187* (2013.01)

(58) Field of Classification Search
USPC .............................. 345/632, 633, 634, 419
See application file for complete search history.

(56) References Cited

U.S. PATENT DOCUMENTS

| | | | |
|---|---|---|---|
| 8,212,859 B2 | 7/2012 | Tang et al. | |
| 8,217,856 B1 | 7/2012 | Petrou | |
| 8,223,088 B1 | 7/2012 | Gomez et al. | |
| 2011/0304557 A1 | 12/2011 | Wilburn et al. | |
| 2012/0249741 A1* | 10/2012 | Maciocci | G06F 3/011 348/46 |
| 2013/0106674 A1* | 5/2013 | Wheeler | G02B 27/017 345/8 |
| 2013/0117377 A1* | 5/2013 | Miller | H04L 67/38 709/205 |
| 2013/0128364 A1* | 5/2013 | Wheeler | A61B 3/113 359/630 |
| 2013/0335442 A1* | 12/2013 | Fleck et al. | 345/629 |
| 2013/0342570 A1* | 12/2013 | Kinnebrew et al. | 345/633 |
| 2014/0002442 A1* | 1/2014 | Lamb et al. | 345/419 |
| 2014/0176591 A1* | 6/2014 | Klein et al. | 345/589 |
| 2014/0267400 A1* | 9/2014 | Mabbutt | G06T 19/006 345/633 |
| 2014/0267419 A1* | 9/2014 | Ballard et al. | 345/633 |
| 2014/0347391 A1* | 11/2014 | Keane et al. | 345/633 |

OTHER PUBLICATIONS

T. N. Hoang, et al., "Augmented Reality in-situ 3D model menu for outdoors", 7th IEEE/ACM International Symposium on Mixed and Augmented Reality, ISMAR 2008, Sep. 15-18, 2008, p. 185-186.*

T. N. Hoang, et al., "Augmented Viewport: an action at distance technique for outdoor AR using distant and zoom lens cameras", 2010 International Symposium on Wearable Computers (ISWC), Oct. 10-13, 2010, p. 1-4.*

Thuong N. Hoang, "Augmented Reality In-Situation Menu of 3D Models", International Workshop on Ubiquitous Virtual Reality, (IWUVR'09), 2009, pp. 17-22.*

M Mine et al., "Moving Objects in Space: Exploiting Proprioception in Virtual-Environment Interaction", Int'l Conf. on Computer Graphics and Interactive Techniques, Los Angeles, Ca, Aug. 1997, pp. 19-26.*

"International Search Report & Written Opinion for PCT Application No. PCT/US2014/041978", dated Oct. 23, 2014, 14 Pages.

Piekarski, et al., "Augmented Reality Working Planes: A Foundation for Action and Construction at a Distance", In Proceedings of the Third IEEE and ACM International Symposium on Mixed and Augmented Reality, Nov. 2, 2004, pp. 162-171.

Billinghurst, et al., "A Wearable Spatial Conferencing Space", In Proceedings of the Second International Symposium on Wearable Computers, Oct. 19, 1998, pp. 76-83.

"Scenarios for a New Assault on the Complexity Barrier", Retrieved on: Sep. 27, 2012, Available at: http://www.jaronlanier.com/cities.html.

"Sensics adds predictive head tracking to zSight HMDs", Published on: Jun. 3, 2011, Available at: http://www.sensics.com/sensics-adds-predictive-heat-tracking-to-zsights-hmds/.

PCT Demand and Response to International Search Report and Written Opinion, filed Feb. 6, 2015 in PCT Application No. PCT/US2014/041978.

"International Preliminary Report on Patentability Issued in PCT Application No. PCT/US2014/041978", dated Sep. 29, 2015, 10 Pages.

"Second Written Opinion Issued in PCT Patent Application No. PCT/US2014/041978", dated May 28, 2015, 9 Pages.

"First Office Action and Search Report Issued in Chinese Patent Application No. 201480034933.0", dated Jan. 12, 2018, 17 Pages.

"Second Office Action Issued in Chinese Patent Application No. 201480034933.0", dated Sep. 17, 2018, 13 Pages.

"Office Action Issued in European Patent Application No. 14737405.2", dated Sep. 25, 2018, 6 Pages.

* cited by examiner

Fig. 1
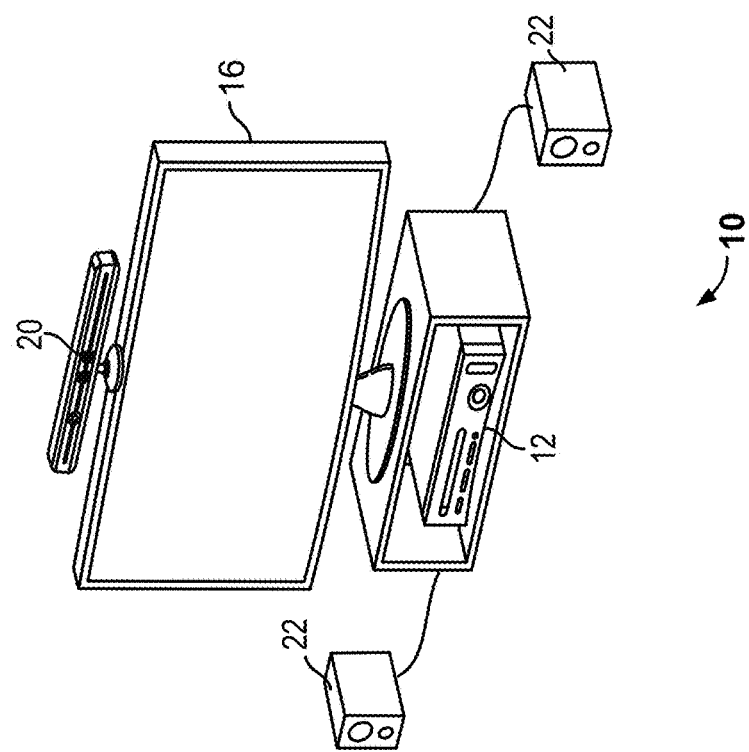
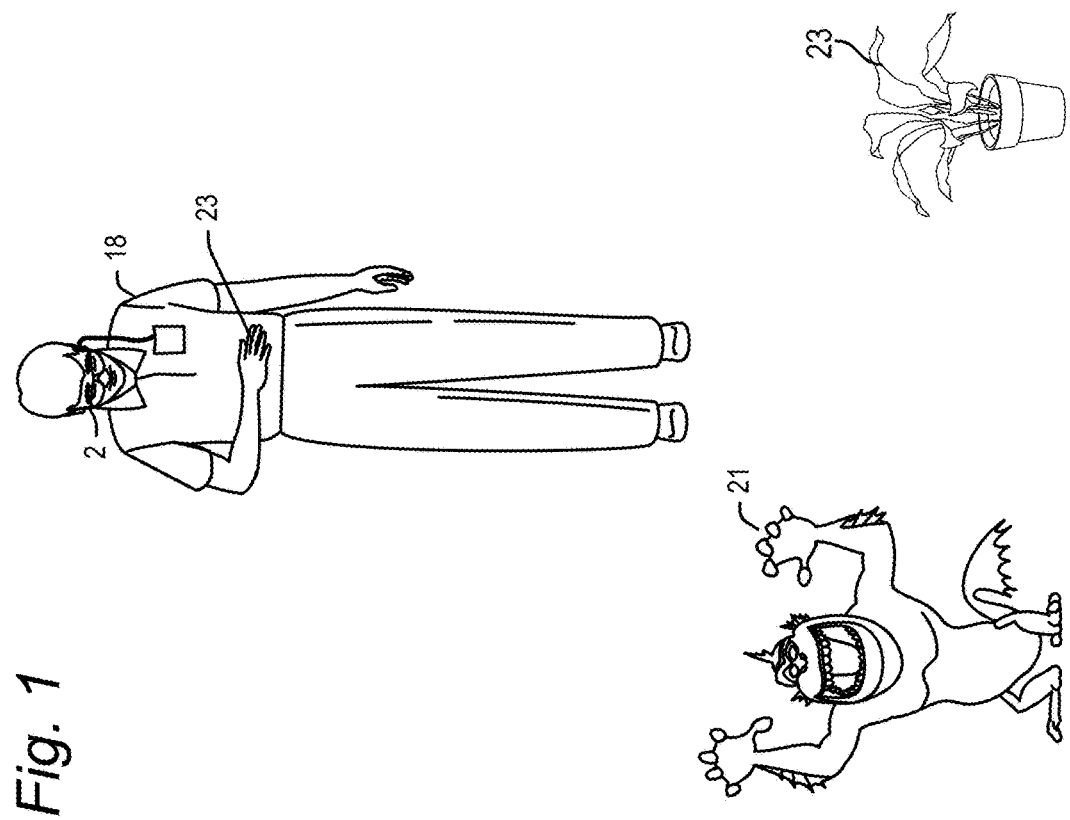

(Step 618)

HYBRID WORLD/BODY LOCKED HUD ON AN HMD

BACKGROUND

Mixed reality is a technology that allows virtual imagery to be mixed with a real world physical environment. A see-through, head mounted display (HMD) device may be worn by a user to view the mixed imagery of real objects and virtual objects displayed in the user's field of view. A user may further interact with virtual objects, for example by performing hand, head or voice gestures to move the objects, alter their appearance or simply view them.

It may be desirable to display commonly used information in a virtual heads-up display on the HMD, such as for example time, date, wireless signal strength, user-selected icons, etc. If the heads-up display (HUD) is head locked, i.e., it moves at the same rate of the head, the user sees the same side of the displayed virtual objects, and they may appear two-dimensional. Additionally, using space in the field of view to render HUD elements wastes precious area for rendering other virtual content. Conversely, if the HUD is a world locked element, the user has to remember where they left the HUD.

SUMMARY

Embodiments of the present technology relate to a system and method for presenting a hybrid world/body locked virtual HUD on a head mounted display device. In addition to displaying virtual objects such as a HUD, the head mounted display device includes a processing unit and sensors which enable the head mounted display device to determine its position and field of view, as well as the positions of virtual objects, in three-dimensional space. In embodiments, as a user moves around within a three-dimensional space, a HUD may remain body locked to the user. For example, the HUD may remain at a predefined position in front of the user's head and elevated above horizontal so that the HUD is outside of a user's field of view and invisible when the user is looking straight ahead or downward. As such, the user may explore and interact with a mixed reality environment presented by the head mounted display device without interference from the HUD. As explained below, the HUD may be placed at other predefined positions in further examples.

When a user wishes to view and/or interact with the HUD, the user may look upward so that the HUD appears within the user's field of view for a predetermined period of time. At that point, the HUD may change from a body locked virtual object to a world locked virtual object. The user is then able to view and interact with the HUD from different positions and perspectives of the HUD. When the user looks down or away so that the HUD is no longer in the user's field of view for a predetermined period of time, the HUD may switch back to being body locked.

In an example, the present technology relates to a system for presenting a mixed reality experience to one or more users, the system comprising: a display device including a display unit for displaying a virtual object; and a computing system operatively coupled to the display device, the computing system generating the virtual object for display on the display device, the computing system positioning the virtual object as being body locked with respect to the display device when it is determined the virtual object is not in a field of view of the display device and the computing system positioning the virtual object as being world locked when it is determined the virtual object is in the field of view of the display device.

In a further example, the present technology relates to a system for presenting a mixed reality experience, the system comprising: a display device including a first set of sensors for sensing data relating to a position of the display device and a display unit for displaying a virtual object to the user of the display device; and a computing system operatively coupled to the display device, the computing system including a second set of sensors for sensing data relating to a position of the user, and the computing system generating the virtual object for display on the display device, the computing system maintaining the virtual object in a body locked position outside of the field of view of the display device when a user is not focused on the virtual object and the computing system maintaining the virtual object in world locked position within the field of view of the display device when the user is focused on the virtual object.

In another example, the present technology relates to a method of presenting a mixed reality experience to one or more users, the method comprising: (a) locking a position of a virtual object in a fixed position with respect to a portion of a user's body when the user is not focused on the virtual object; and (b) locking a position of the virtual object in a fixed position in three-dimensional space when the user is not focused on the virtual object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is an illustration of example components of one embodiment of a system for presenting a mixed reality environment to one or more users.

DETAILED DESCRIPTION

Figure 2:
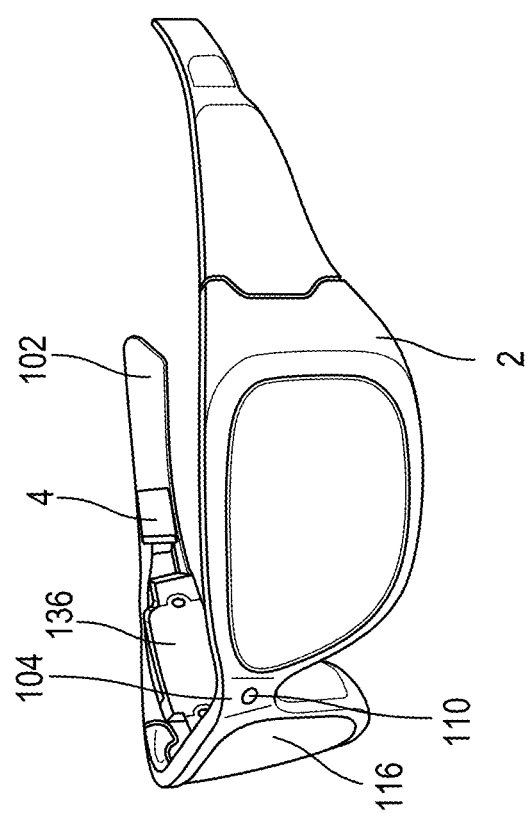
FIG. 2 is a perspective view of one embodiment of a head mounted display unit.

Embodiments of the present technology will now be described with reference to FIGS. 1-14, which in general relate to a mixed reality environment wherein a HUD is body locked and out of sight when not being viewed, and is world locked when being viewed and/or interacted with. The system for implementing the mixed reality environment may include a mobile display device communicating with a hub computing system. The mobile display device may include a mobile processing unit coupled to a head mounted display device (or other suitable apparatus).

A head mounted display device may include a display element. The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert the virtual image in the FOV of the user. Once the system knows where to project the virtual image, the image is projected using the display element.

In embodiments, the hub computing system and one or more of the processing units may cooperate to build a model of the environment including the x, y, z Cartesian positions of all users, real world objects and virtual three-dimensional objects in the room or other environment. The positions of each head mounted display device worn by the users in the environment may be calibrated to the model of the environment and to each other. This allows the system to determine each user's line of sight and FOV of the environment. Thus, a virtual image may be displayed to each user, but the system determines the display of the virtual image from each user's perspective, adjusting the virtual image for parallax and any occlusions from or by other objects in the environment. The model of the environment, referred to herein as a scene map, as well as all tracking of the user's FOV and objects in the environment may be generated by the hub and mobile processing unit working in tandem or individually.

A user may choose to interact with a HUD or other virtual object appearing within the user's FOV. As used herein, the term "interact" encompasses both physical interaction and verbal interaction of a user with a virtual object. Physical interaction includes a user performing a predefined gesture using his or her fingers, hand, head and/or other body part(s) recognized by the mixed reality system as a user-request for the system to perform a predefined action. Such predefined gestures may include but are not limited to pointing at, grabbing, and pushing virtual objects.

A user may also physically interact with a virtual object with his or her eyes. In some instances, eye gaze data identifies where a user is focusing in the FOV, and can thus identify that a user is looking at a particular virtual object. Sustained eye gaze, or a blink or blink sequence, may thus be a physical interaction whereby a user selects one or more virtual objects.

As used herein, a user simply looking at a virtual object, such as viewing content in a HUD, is a further example of physical interaction of a user with a virtual object.

A user may alternatively or additionally interact with virtual objects using verbal gestures, such as for example a spoken word or phrase recognized by the mixed reality system as a user request for the system to perform a predefined action. Verbal gestures may be used in conjunction with physical gestures to interact with one or more virtual objects in the mixed reality environment.

As a user moves around within a mixed reality environment, virtual objects may remain world locked. One example is a HUD in the field of view of the user. World locked virtual objects may remain anchored and stationary in the mixed reality environment so that a user can move around world locked virtual objects and see them from different perspectives and distances.

In accordance with the present technology, when a user looks at a position including the HUD, the HUD may become world locked. On the other hand, when a user is not looking at the HUD, the HUD may switch to being body locked to the user. That is, the position of the HUD (or other body locked virtual objects) may be altered so as to remain in a predefined position relative to the user's body.

In embodiments, the hybrid world/body locked HUD (also referred to herein as the "hybrid HUD") may include a variety of useful information, including for example the time, date and/or signal strength of the head mounted display device. However, the hybrid HUD may include any of a variety of other content, including for example static content such as text, pictures and photographs, or dynamic content such as video.

Figure 3:
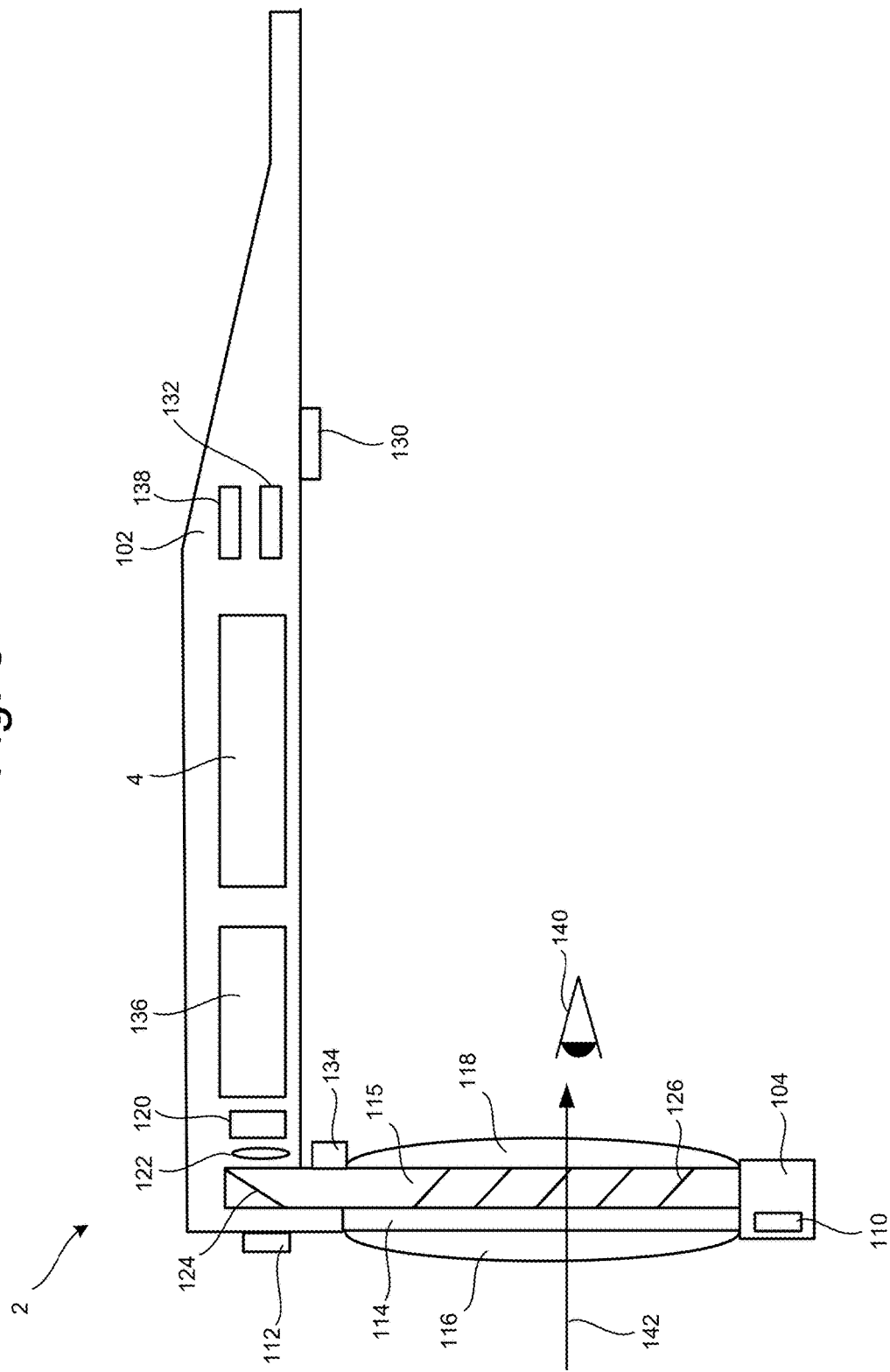
FIG. 3 is a side view of a portion of one embodiment of a head mounted display unit.

FIG. 1 illustrates a system 10 for providing a mixed reality experience by fusing virtual image 21 with real content within a user's FOV. FIG. 1 shows a single user 18 wearing a head mounted display device 2, but it is understood that more than one user may be present in the mixed reality environment and viewing the same virtual objects from their own perspective. As seen in FIGS. 2 and 3, a head mounted display device 2 may include an integrated processing unit 4. In other embodiments, the processing unit 4 may be separate from the head mounted display device 2, and may communicate with the head mounted display device 2 via wired or wireless communication.

Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12. As explained hereinafter, hub computing system 12 may be provided remotely from the processing unit 4, so that the hub computing system 12 and processing unit 4 communicate via a wireless network such as a LAN or WAN. In further embodiments, the hub computing system 12 may be omitted to provide a mobile mixed reality experience using the head mounted display devices 2 and processing units 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes a capture device 20 for capturing image data from portions of a scene within its FOV. As used herein, a scene is the environment in which the users move around, which environment is captured within the FOV of the capture device 20 and/or the FOV of each head mounted display device 2. FIG. 1 shows a single capture device 20, but there may be multiple capture devices in further embodiments which cooperate to collectively capture image data from a scene within the composite FOVs of the multiple capture devices 20. Capture device 20 may include one or more cameras that visually monitor the user 18 and the surrounding space such that gestures and/or movements performed by the user, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. In one example, audiovisual device 16 includes internal speakers. In other embodiments, audiovisual device 16 and hub computing system 12 may be connected to external speakers 22.

The hub computing system 12, together with the head mounted display device 2 and processing unit 4, may provide a mixed reality experience where one or more virtual images, such as virtual image 21 in FIG. 1, may be mixed together with real world objects in a scene. FIG. 1 illustrates examples of a plant 23 or a user's hand 23 as real world objects appearing within the user's FOV.

FIGS. 2 and 3 show perspective and side views of the head mounted display device 2. FIG. 3 shows the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). Light-guide optical element 115 channels artificial light to the eye. More details of opacity filter 114 and light-guide optical element 115 are provided in U.S. Published Patent Application No. 2012/0127284, entitled, "Head-Mounted Display Device Which Provides Surround Video," which application was published on May 24, 2012.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that one of the five surfaces is labeled 126 to prevent over-crowding of the drawing. Reflecting surfaces 126 couple the light waves incident upon those reflecting surfaces out of the substrate into the eye 140 of the user.

More details of a light-guide optical element can be found in United States Patent Publication No. 2008/0285140, entitled "Substrate-Guided Optical Devices," published on Nov. 20, 2008.

Figure 4:
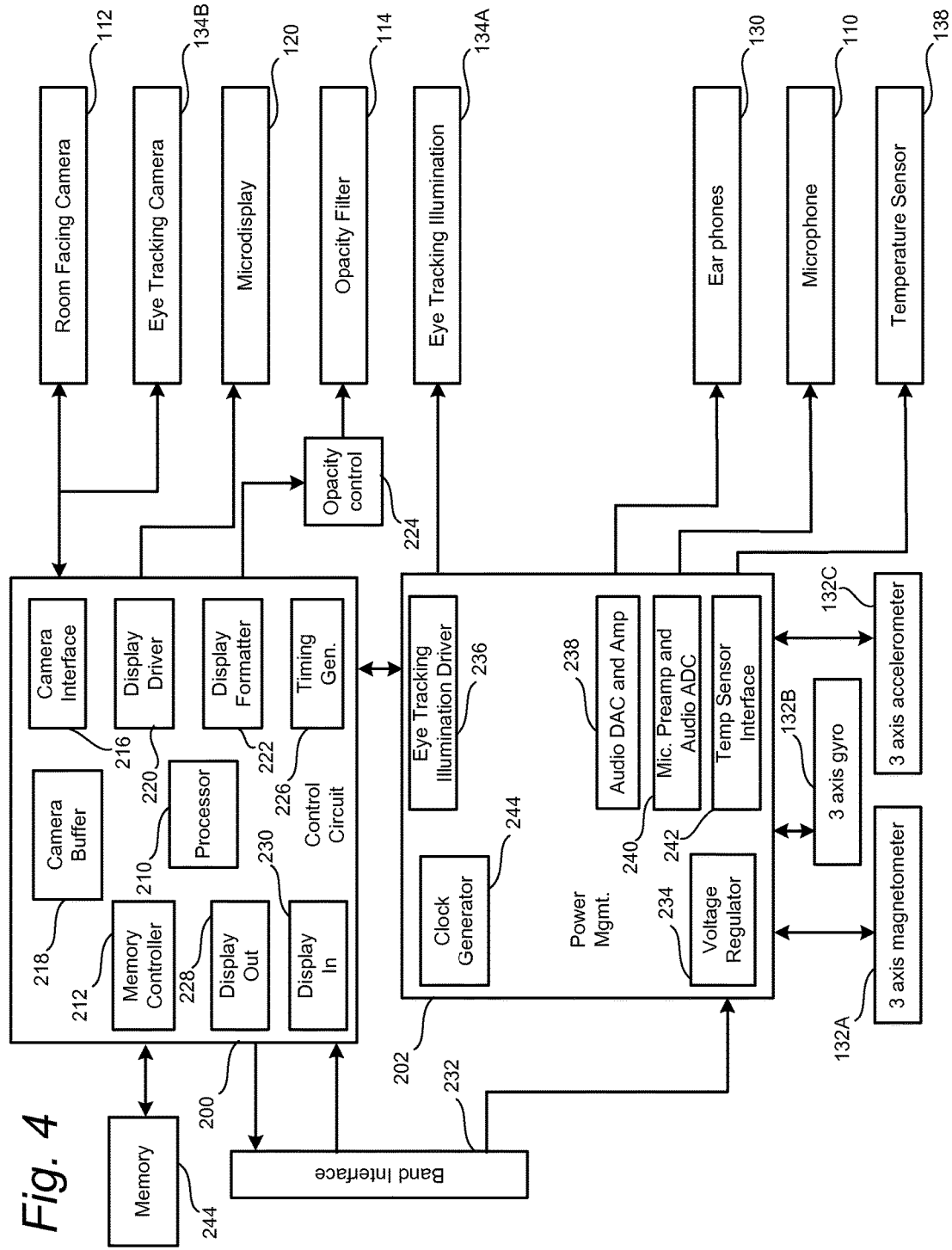
FIG. 4 is a block diagram of one embodiment of the components of a head mounted display unit.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 5:
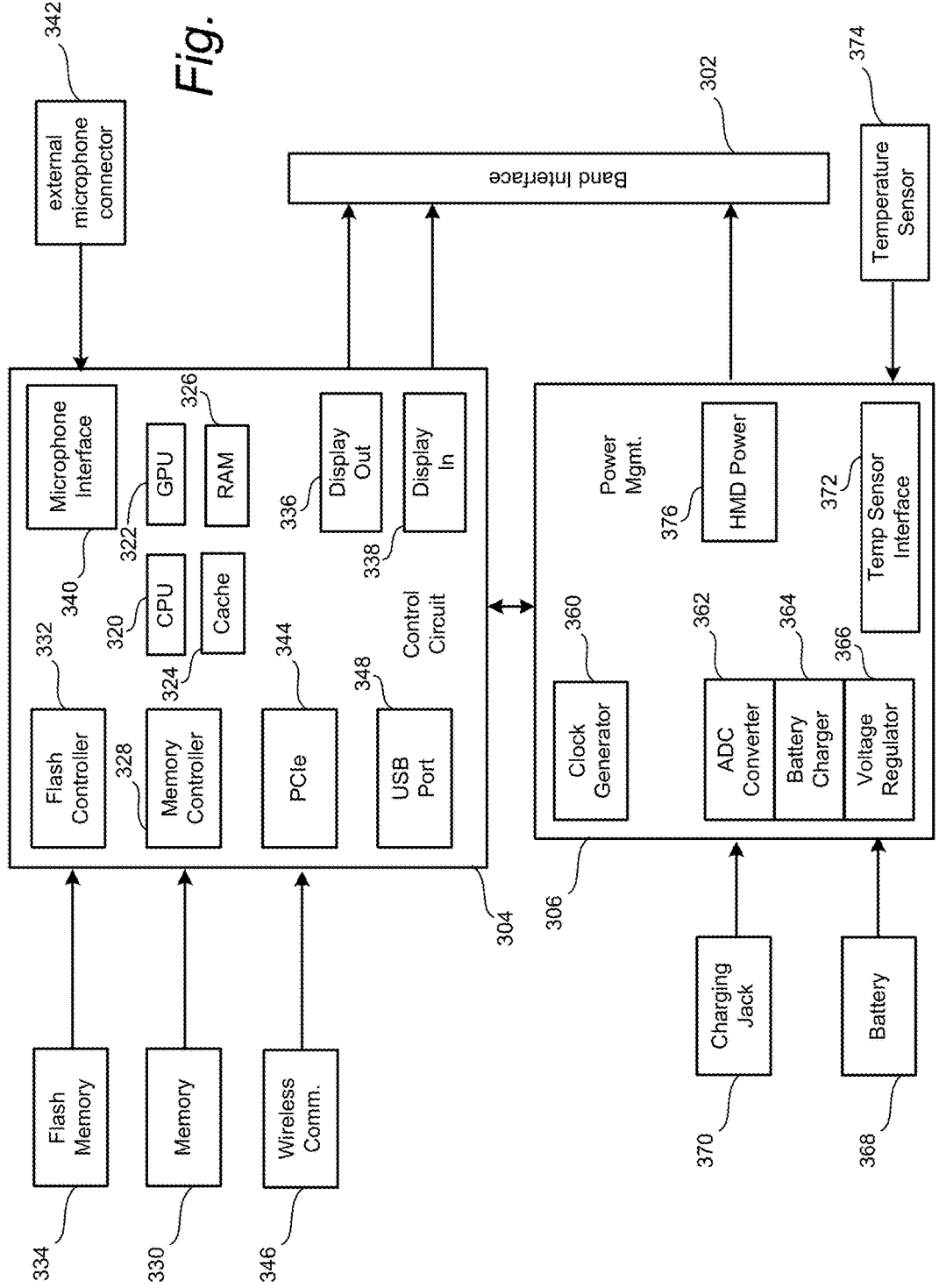
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual images seamlessly with the user's view of the real world. Additionally, the head mounted display device components of FIG. 4 include many sensors that track various conditions. Head mounted display device 2 will receive instructions about the virtual image from processing unit 4 and will provide the sensor information back to processing unit 4. Processing unit 4, the components of which are depicted in FIG. 4, will receive the sensory information from head mounted display device 2 and will exchange information and data with the hub computing system 12 (FIG. 1). Based on that exchange of information and data, processing unit 4 will determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing system 12 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
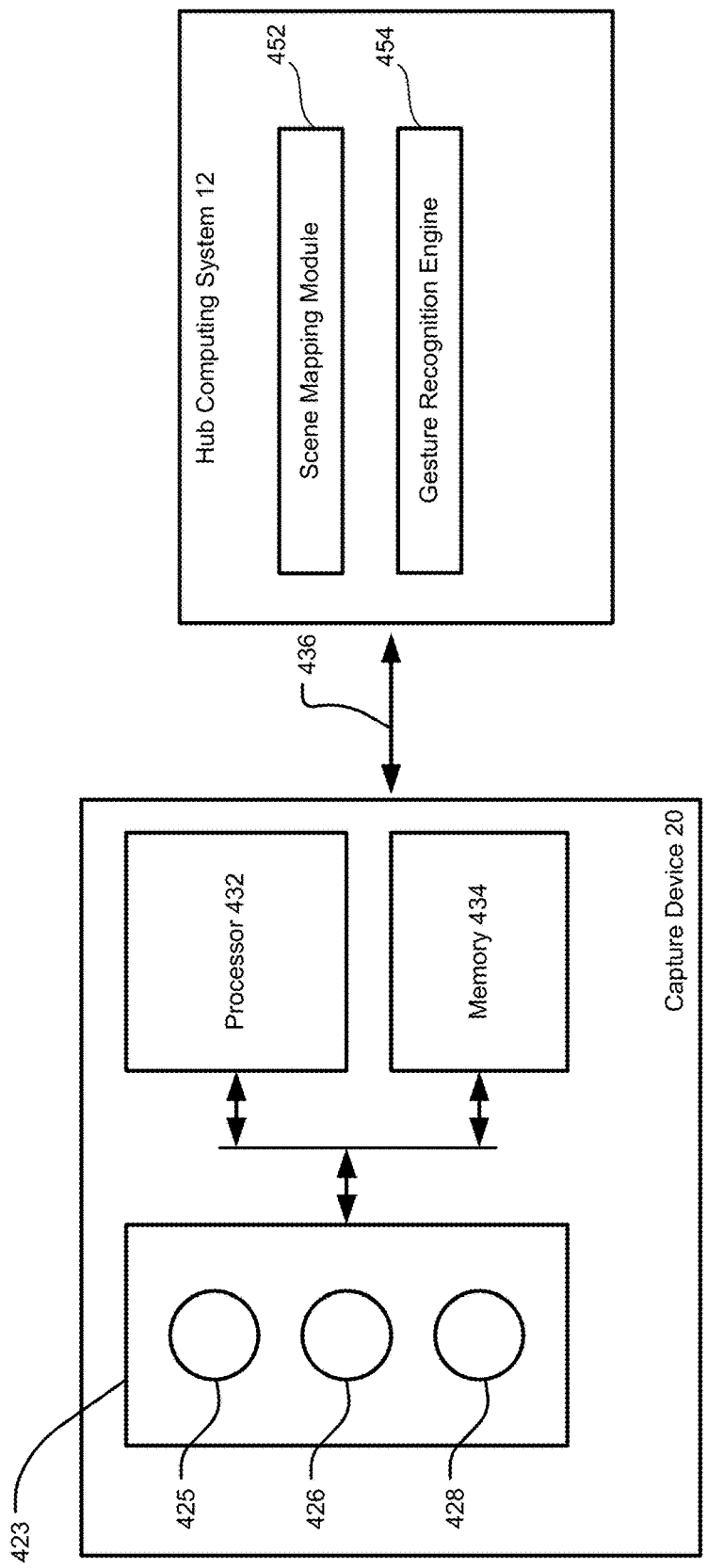
FIG. 6 is a block diagram of one embodiment of the components of a hub computing system used with head mounted display unit.

FIG. 6 illustrates an example embodiment of hub computing system 12 with a capture device 20. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 6, capture device 20 may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20 may emit an infrared light onto the scene and may then use sensors (in some embodiments, including sensors not shown) to detect the backscattered light from the surface of one or more targets and objects in the scene using, for example, the 3-D camera 426 and/or the RGB camera 428.

In an example embodiment, the capture device 20 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 6, in one embodiment, memory 434 may be a separate component in communication with the image camera component 423 and processor 432. According to another embodiment, the memory 434 may be integrated into processor 432 and/or the image camera component 423.

Capture device 20 is in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20 that may be used to determine when to capture, for example, a scene via the communication link 436. Additionally, the capture device 20 provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

The above-described hub computing system 12, together with the head mounted display device 2 and processing unit 4, are able to insert a virtual three-dimensional object into the FOV of one or more users so that the virtual three-dimensional object augments and/or replaces the view of the real world. In one embodiment, head mounted display device 2, processing unit 4 and hub computing system 12 work together as each of the devices includes a subset of sensors that are used to obtain the data to determine where, when and how to insert the virtual three-dimensional object. In one embodiment, the calculations that determine where, when and how to insert a virtual three-dimensional object are performed by the hub computing system 12 and processing unit 4 working in tandem with each other. However, in further embodiments, all calculations may be performed by the hub computing system 12 working alone or the processing unit(s) 4 working alone. In other embodiments, at least some of the calculations can be performed by the head mounted display device 2.

In one example embodiment, hub computing system 12 and processing units 4 work together to create the scene map or model of the environment that the one or more users are in and track various moving objects in that environment. In addition, hub computing system 12 and/or processing unit 4 track the FOV of a head mounted display device 2 worn by a user 18 by tracking the position and orientation of the head mounted display device 2. Sensor information obtained by head mounted display device 2 is transmitted to processing unit 4. In one example, that information is transmitted to the hub computing system 12 which updates the scene model and transmits it back to the processing unit. The processing unit 4 then uses additional sensor information it receives from head mounted display device 2 to refine the FOV of the user and provide instructions to head mounted display device 2 on where, when and how to insert the virtual three-dimensional object. Based on sensor information from cameras in the capture device 20 and head mounted display device(s) 2, the scene model and the tracking information may be periodically updated between hub computing system 12 and processing unit 4 in a closed loop feedback system as explained below.

Figure 7:
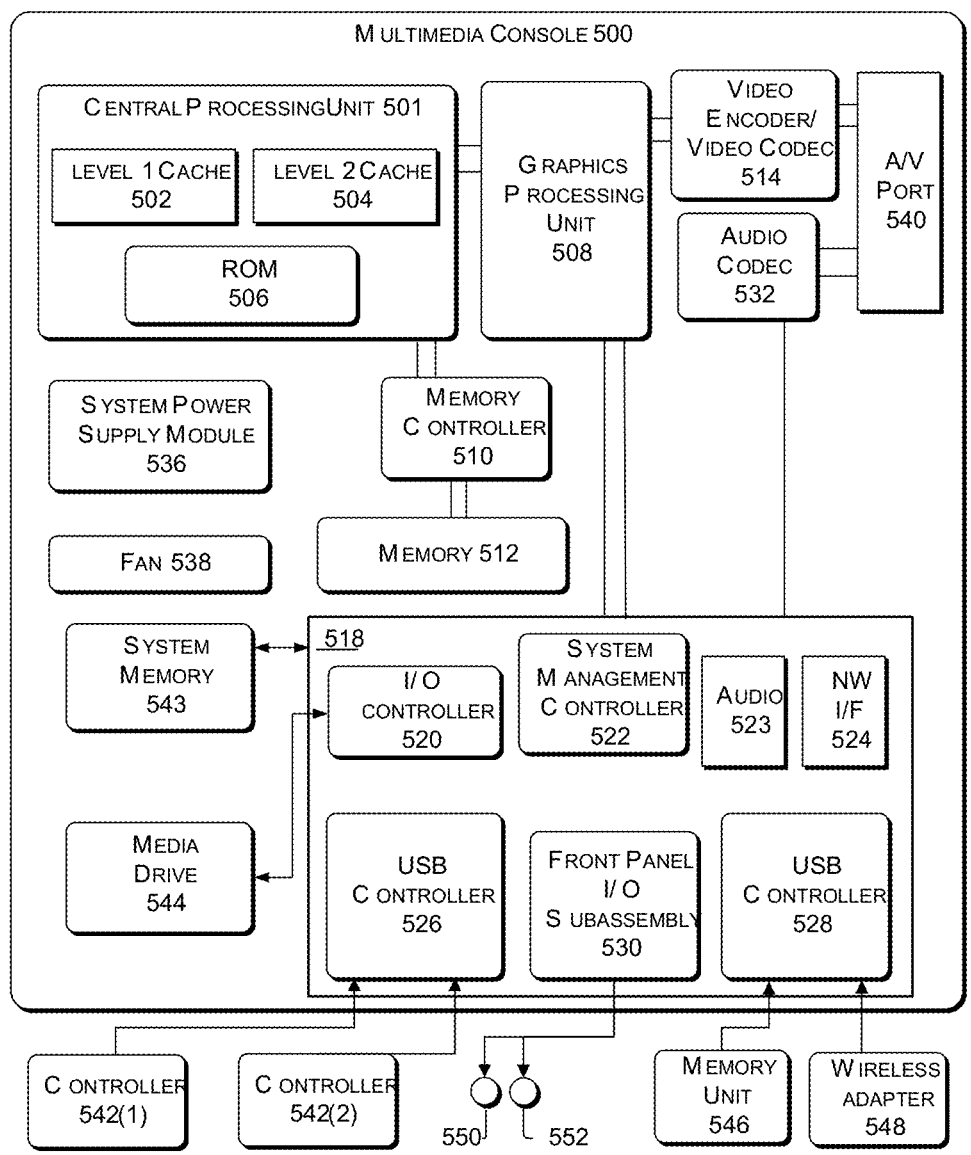
FIG. 7 is a block diagram of one embodiment of a computing system that can be used to implement the hub computing system described herein.

FIG. 7 illustrates an example embodiment of a computing system that may be used to implement hub computing system 12. As shown in FIG. 7, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the console 500 via USB controller 526 or other interface. In other embodiments, hub computing system 12 can be implemented using other hardware architectures. No one hardware architecture is required.

The head mounted display device 2 and processing unit 4 (collectively referred to at times as the mobile display device) shown in FIG. 1 are in communication with one hub computing system 12 (also referred to as the hub 12). There may be one or two or more mobile display devices in communication with the hub 12 in further embodiments. Each of the mobile display devices may communicate with the hub using wireless communication, as described above. In such an embodiment, it is contemplated that much of the information that is useful to the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs 12, with each hub including one or more mobile display devices. The hubs can communicate with each other directly or via the Internet (or other networks). Such an embodiment is disclosed in U.S. patent application Ser. No. 12/905,952 to Flaks et al., entitled "Fusing Virtual Content Into Real Content," filed Oct. 15, 2010.

Moreover, in further embodiments, the hub 12 may be omitted altogether. One benefit of such an embodiment is that the mixed reality experience of the present system becomes completely mobile, and may be used in both indoor or outdoor settings. In such an embodiment, all functions performed by the hub 12 in the description that follows may alternatively be performed by one of the processing units 4, some of the processing units 4 working in tandem, or all of the processing units 4 working in tandem. In such an embodiment, the respective mobile display devices 2 perform all functions of system 10, including generating and updating state data, a scene map, each user's view of the scene map, all texture and rendering information, video and audio data, and other information to perform the operations described herein. The embodiments described below with respect to the flowchart of FIG. 9 include a hub 12. However, in each such embodiment, one or more of the processing units 4 may alternatively perform all described functions of the hub 12.

One example of a virtual object which may be displayed to a user via the head mounted display device 2 is the hybrid HUD described above. The hybrid HUD, such as HUD 460 shown in FIG. 10 may be a virtual display slate including any variety of content, such as for example date, time and/or signal strength of the signal received by the head mounted display device 2. The hybrid HUD 460 may be a virtual screen displayed to the user on which content may be presented to the user. The opacity filter 114 (described above) is used to mask real world objects and light behind (from the user's view point) the hybrid HUD 460, so that the hybrid HUD 460 appears as a virtual screen for viewing content.

The content displayed on HUD 460 may be a wide variety of content, including static content such as text and graphics, or dynamic content such as video. A HUD 460 may further act as a computer monitor, so that the content may be email, web pages, games or any other content presented on a monitor. A software application running on hub 12 may generate the HUD 460, as well as determine the content to be displayed on HUD 460. As explained below, HUD 460 may be placed at a predetermined position with respect to a user with which HUD 460 is associated. In embodiments, the position and size of HUD 460, as well as the type of content displayed on HUD 460, may be user configurable through gestures and the like. While HUD 460 has been described above as content appearing on a virtual display slate, it is understood that HUD 460 may simply be content displayed at a predetermined position with respect to a user without the background virtual slate.

Figure 8:
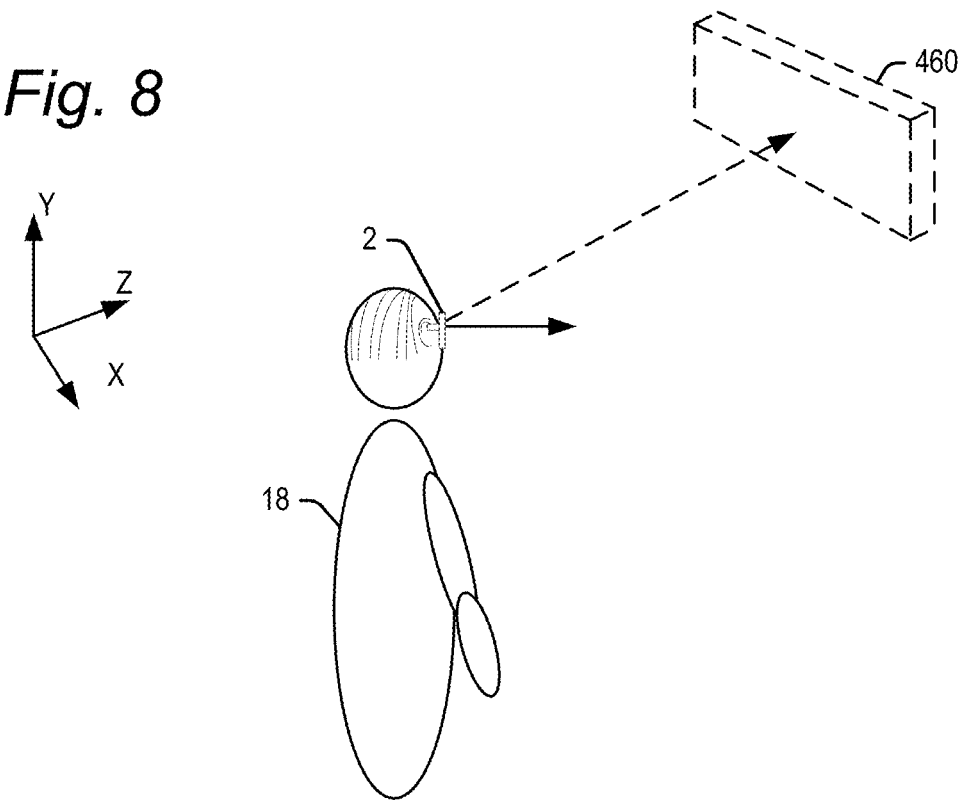
FIG. 8 is a perspective view illustration of a virtual object which is body locked to a user when a user is not focused on the virtual object.
Figure 9:
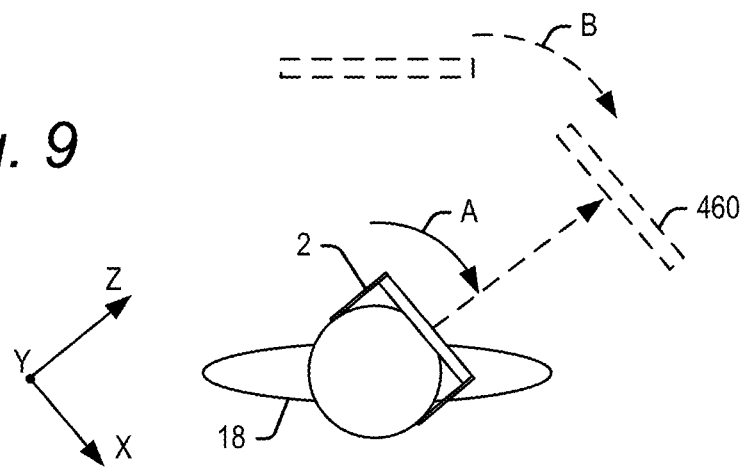
FIG. 9 is a top view illustration of a virtual object which is body locked to a user and moving with a user when a user is not focused on the virtual object.

As noted in the Background section, there are disadvantages associated with a wholly body locked HUD, or a wholly world locked HUD. In accordance with aspects of the present technology, hybrid HUD 460 may be body locked and move with the user when not being looked at, but may switch to being world locked when viewed by the user. Referring now to FIGS. 8-11, when not being viewed, the hybrid HUD 460 may be positioned at a predetermined location with respect to a user's head. As shown in FIGS. 8 and 9, in embodiments, this predetermined location maybe straight ahead of a user and elevated above the horizontal. For example, the HUD 460 may be 2 to 5 feet in front of the user and 20° to 40° above a horizontal plane in which the user's head resides. These values are by way of example and the distance in front of the user and/or angle above horizontal may be outside of these ranges in further embodiments.

As noted, when the HUD 460 is not being viewed, the HUD 460 may remain body locked and not visible to the user (as indicated by the dashed lines in FIGS. 8 and 9). Thus as the user moves around within the mixed reality environment, translating along the x, y and/or z axes, the HUD 460 may undergo similar translations. In this example, the y-axis is an axis down through the user's head, the z-axis is straight out from the user's face, perpendicular to the y-axis, and the x-axis may be parallel to the user's face and head mounted display device 2, perpendicular to both the y and z axes.

In embodiments, the HUD 460 may be body locked to the user's head, so that when a user turns his or her head, the HUD 460 undergoes a similar horizontal rotation to remain in front of the user and above horizontal. Thus, in the example of FIG. 9, the user has gone from looking straight ahead to looking right, along the direction of arrow A, around the y-axis. In this instance, the HUD 460 may undergo a similar rotation along the direction of arrow B, maintaining the same distance away from the user.

In embodiments, the HUD 460 may remain body locked by moving with the user's head when the user rotates his or her head about the y-axis in FIGS. 8 and 9. In embodiments, the HUD 460 may remain body locked, as that term is used herein, even though the HUD 460 may be insensitive to user head movements about the x-axis. Thus, in examples, the HUD 460 may remain stationary in its position above horizontal when a user nods his or her head up and down. This allows the user to look up and see the HUD 460.

The HUD 460 may also remain body locked, as that term is used herein, even though the HUD 460 may be insensitive to user head movements about the z-axis. Thus, in examples, the HUD 460 may remain stationary in its position above horizontal when a user tilts his or her head left and right. This allows the user to view the HUD 460 without it rotating from horizontal in the event the user's head is tilted.

Thus, as a user moves around in the mixed reality environment, the HUD 460 may remain body locked to the user, translating with the user and rotating with the user as a user turns his head left or right. As noted, the HUD 460 and be insensitive to a user nodding his head up or down, or tilting his head left or right. However, in further embodiments, the HUD 460 may remain body locked for rotations about any 2 axes, while being insensitive for rotations about the third axis.

Thus, for example in FIG. 8, the HUD 460 may rotate about the y-axis as a user turns his head left or right, and the HUD 460 may rotate about the z-axis as a user tilts his head left or right. HUD 460 may remain stationary for head rotations about the x-axis so that the user can look up and see the HUD 460.

As noted above, the HUD 460 may be placed at positions other than above the horizontal. In one further example, the HUD 460 may be placed at horizontal, but off to the left or right of the user's FOV when looking straight ahead. In such an embodiment, the HUD 460 may rotate about the x-axis as a user nods his head up or down, and the HUD 460 may rotate about the z-axis (or remain stationary) as a user tilts his head left or right. HUD 460 may remain stationary for head rotations about the y-axis so that the user can look left or right and see the HUD 460. The HUD 460 may be placed in other locations so as not to be visible when the user is looking straight ahead.

In further embodiments, it is contemplated that the HUD 460 may be body locked so as to move with the user when the user rotates his head about all three x, y and z axes. In such an embodiment, the HUD 460 may remain outside of the FOV of the head mounted display device 2 when body locked to the user, regardless of where the user looks. However, in such embodiments, a position maybe predefined as the access position for the HUD 460. For example, the predefined position maybe in front of the user and above the horizontal, though it may be at other predefined positions in further embodiments. When a user looks at the predefined access position, the HUD 460 may move to that predefined access position (or some other predefined position) and change from being body locked to being world locked.

Figure 10:
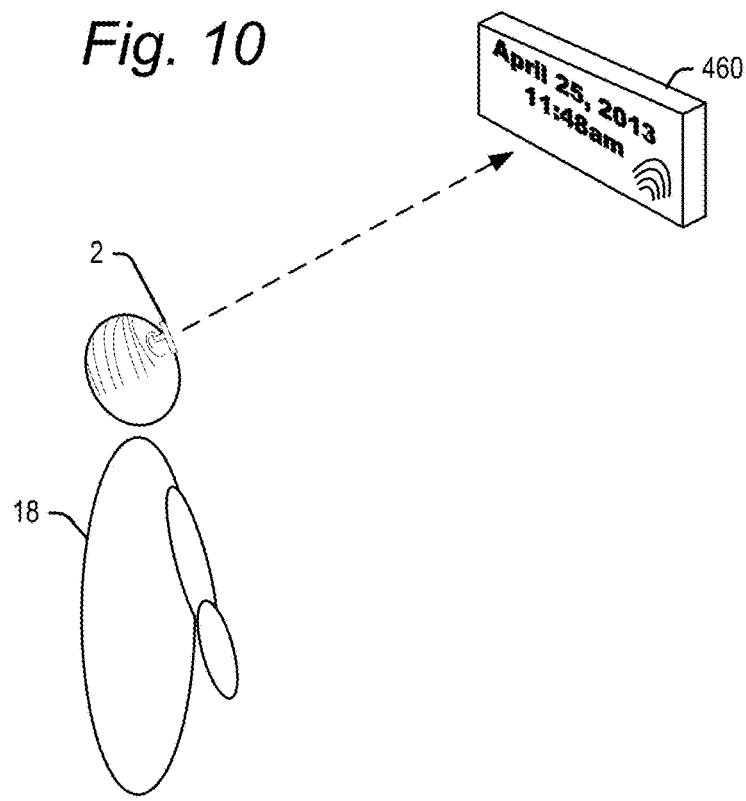
FIG. 10 is a perspective view illustration of a virtual object which is world locked in three-dimensional space when a user is focused on the virtual object.
Figure 11:
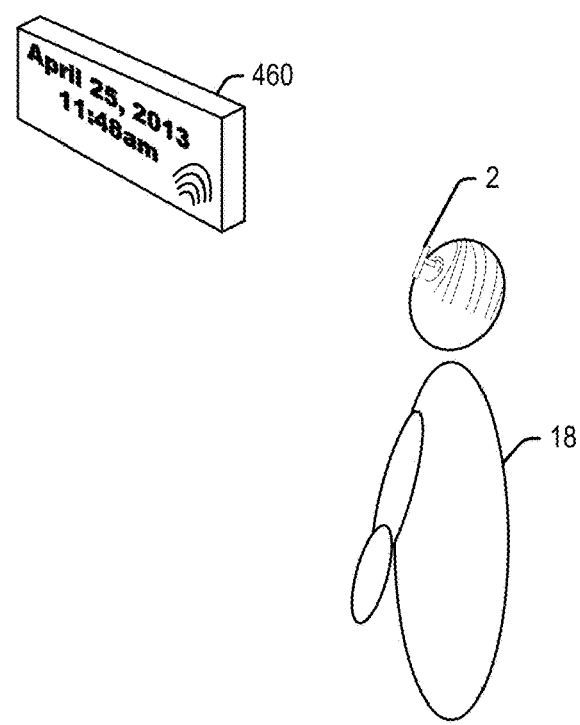
FIG. 11 is a perspective view illustration of a user moving around a virtual object which is world locked in three-dimensional space when a user is focused on the virtual object.

Referring now to FIGS. 10 and 11, the HUD 460 may remain body locked as described above until the user focuses on the HUD 460, for example by looking at the position where the HUD 460 is located for a predetermined period of time. The predetermined period of time, which may for example be 1 to 3 seconds, prevents the system from displaying the HUD 460 when a user looks in the direction of the HUD 460 without intending to access the HUD 460. However, it is understood that the predetermined period of time may be omitted in further embodiments so that the HUD 460 is displayed anytime the user looks in the direction of the HUD 460. Where a predetermined period of time is built-in, that predetermined period of time may be less than 1 second or greater than 3 seconds in further embodiments.

Once a user looks in the direction of the HUD 460 for the predetermined rate of time (in embodiments having a predetermined period of time), the HUD 460 may switch from being body locked to being world locked. Once world locked, in addition to being able to view the contents of the HUD 460 as shown in FIG. 10, a user may move around the HUD 460 as shown for example in FIG. 11. A user may move away from or closer to the HUD 460 and/or the user may move around the HUD 460 to view it from different perspectives. In this way, the illusion of reality and three dimensional nature of the HUD 460 is facilitated.

A user may also interact with the HUD 460 when it is in the FOV of the user. A user may interact with the content of the HUD 460, for example by adding new content, changing existing content or removing existing content. A user may also interact by resizing the HUD 460. A user may additionally interact by changing a world locked position of the HUD 460, or by changing a body locked position of the HUD 460 for when the HUD 460 returns to its body locked position.

If the user looks away from the HUD 460 for predetermined period of time, the HUD 460 may again move back to a body locked position with respect to the user. The predetermined period of time, which may for example be 1 to 3 seconds, prevents the system from removing the HUD 460 when a user looks away from the HUD 460 without intending to remove the HUD 460. However, it is understood that the predetermined period of time may be omitted in further embodiments so that the HUD 460 is removed anytime the user looks away from the HUD 460. Where a predetermined period of time is built-in, that predetermined period of time may be less than 1 second or greater than 3 seconds in further embodiments.

As explained below, the head mounted display device 2 may display all virtual objects appearing within the FOV of the head mounted display device 2. Thus, in embodiments, the HUD 460 may remain world locked and displayed anytime the HUD 460 is within the FOV. If the user moves his head so that the HUD 460 is outside of the FOV for less than the predetermined period of time (in embodiments having a predetermined period of time), the HUD 460 may remain world locked and may again be displayed when the HUD 460 again enters the FOV.

It may be that the HUD 460 is within the FOV of the head mounted display device 2, but the device 2 is able to determine that the user is not focused on the HUD 460. The device 2 may determine at the HUD 460 is at a periphery of the FOV, or the eye tracking assembly 134 may indicate that the user is looking in a different direction than the HUD 460. Accordingly, in further embodiments, even though the HUD 460 is within the FOV, if the user is not focused on the HUD 460 for more than the predetermined period of time (in embodiments having a predetermined period of time), the HUD 460 may be taken down and it may switch from its world locked position to its body locked position.

Using embodiments of the present technology, a user is free to interact with a mixed reality environment without interference from the HUD 460 when the user is not interested in the HUD 460. However, the HUD 460 remains accessible at to the user and may be accessed by the user looking in a predefined position which remains the same relative to the user's body position.

Figure 12:
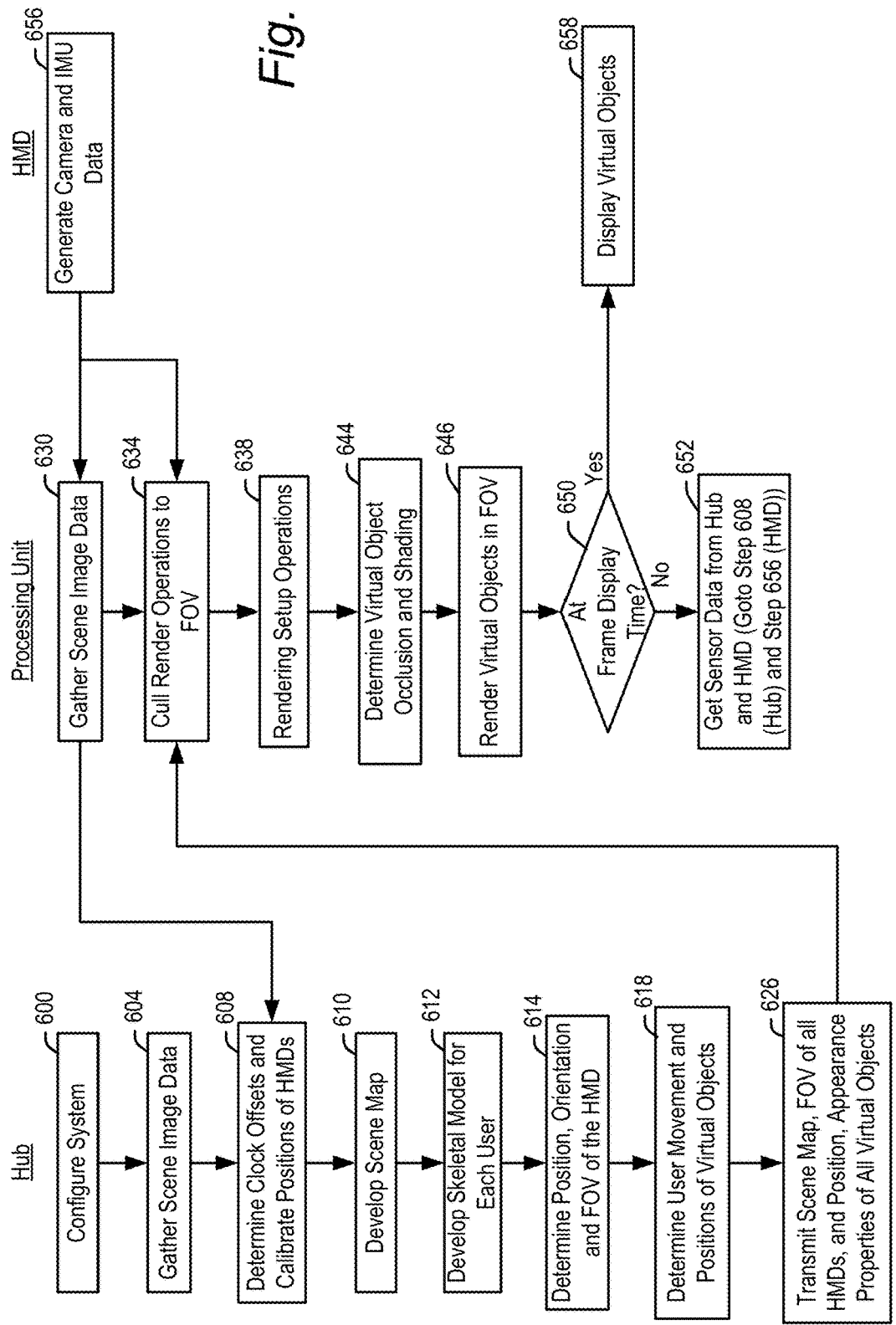
FIG. 12 is a flowchart showing the operation and collaboration of the hub computing system, one or more processing units and one or more head mounted display units of the present system.

FIG. 12 is a high level flowchart of the operation and interactivity of the hub computing system 12, the processing unit 4 and head mounted display device 2 during a discrete time period such as the time it takes to generate, render and display a single frame of image data to each user. In embodiments, data may be refreshed at a rate of 60 Hz, though it may be refreshed more often or less often in further embodiments.

In general, the system generates a scene map having x, y, z coordinates of the environment and objects in the environment such as users, real world objects and virtual objects. As noted above, the virtual object such as HUD 460 may be virtually placed in the environment for example by an application running on hub computing system 12 or by user 18. The system also tracks the FOV of each user. While all users may possibly be viewing the same aspects of the scene, they are viewing them from different perspectives. Thus, the system generates each person's FOV of the scene to adjust for parallax and occlusion of virtual or real world objects, which may again be different for each user. It is possible that the HUD of a first user may or may not be visible to other users (based for example on privacy settings of the first user).

For a given frame of image data, a user's view may include one or more real and/or virtual objects. As a user turns his/her head, for example left to right or up and down, the relative position of real world objects in the user's FOV inherently moves within the user's FOV. For example, plant 23 in FIG. 1 may appear on the right side of a user's FOV at first. But if the user then turns his/her head toward the right, the plant 23 may eventually end up on the left side of the user's FOV.

However, the display of virtual objects to a user as the user moves his head is a more difficult problem. In an example where a user is looking at a world locked virtual object in his FOV, if the user moves his head left to move the FOV left, the display of the virtual object needs to be shifted to the right by an amount of the user's FOV shift, so that the net effect is that the virtual object remains stationary within the FOV. A system for properly displaying world and body locked virtual objects is explained below with respect to the flowchart of FIGS. 12-??.

The system for presenting mixed reality to one or more users 18 may be configured in step 600. For example, a user 18 or operator of the system may specify the virtual objects that are to be presented, including for example HUD 460. The user may also configure the contents of HUD 460, and how, when and where it is to be presented. While embodiments have been described including a single HUD 460, it is understood that two or more HUDs with differing content may be generated and positioned in the scene. Each such HUD 460 may be a hybrid HUD 460 as described herein.

In steps 604 and 630, hub 12 and processing unit 4 gather data from the scene. For the hub 12, this may be image and audio data sensed by the depth camera 426 and RGB camera 428 of capture device 20. For the processing unit 4, this may be image data sensed in step 656 by the head mounted display device 2, and in particular, by the cameras 112, the eye tracking assemblies 134 and the IMU 132. The data gathered by the head mounted display device 2 is sent to the processing unit 4 in step 656. The processing unit 4 processes this data, as well as sending it to the hub 12 in step 630.

In step 608, the hub 12 performs various setup operations that allow the hub 12 to coordinate the image data of its capture device 20 and the one or more processing units 4. In particular, even if the position of the capture device 20 is known with respect to a scene (which it may not be), the cameras on the head mounted display devices 2 are moving around in the scene. Therefore, in embodiments, the positions and time capture of each of the imaging cameras need to be calibrated to the scene, each other and the hub 12. Further details of step 608 are described U.S. Patent Publication No. 2012/0105473, entitled, "Low-Latency Fusing of Virtual And Real Content," published on May 3, 2012.

Once the system is calibrated in step 608, a scene map may be developed in step 610 identifying the geometry of the scene as well as the geometry and positions of objects within the scene. In embodiments, the scene map generated in a given frame may include the x, y and z positions of all users, real world objects and virtual objects in the scene. This information may be obtained during the image data gathering steps 604, 630 and 656 and is calibrated together in step 608.

At least the capture device 20 includes a depth camera for determining the depth of the scene (to the extent it may be bounded by walls, etc.) as well as the depth position of objects within the scene. As explained below, the scene map is used in positioning virtual objects within the scene, as well as displaying virtual three-dimensional objects with the proper occlusion (a virtual three-dimensional object may be occluded, or a virtual three-dimensional object may occlude, a real world object or another virtual three-dimensional object).

The system 10 may include multiple depth image cameras to obtain all of the depth images from a scene, or a single depth image camera, such as for example depth image camera 426 of capture device 20 may be sufficient to capture all depth images from a scene. An analogous method for determining a scene map within an unknown environment is known as simultaneous localization and mapping (SLAM). One example of SLAM is disclosed in U.S. Pat. No. 7,774,158, entitled "Systems and Methods for Landmark Generation for Visual Simultaneous Localization and Mapping," issued Aug. 10, 2010.

In step 612, the system may detect and track moving objects such as humans moving in the room, and update the scene map based on the positions of moving objects. This includes the use of skeletal models of the users within the scene as described above.

Figure 13:
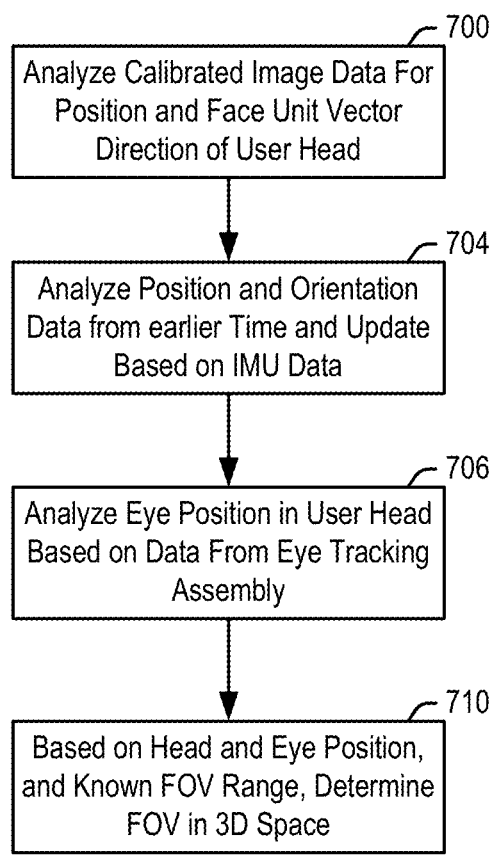
FIGS. 13 and 14 are more detailed flowcharts of examples of various steps shown in the flowchart of FIG. 12.

In step 614, the hub determines the x, y and z position, the orientation and the FOV of the head mounted display device 2. Further details of step 614 are now described with respect to the flowchart of FIG. 13. The steps of FIG. 13 are described below with respect to a single user. However, the steps of FIG. 13 may be carried out for each user within the scene.

In step 700, the calibrated image data for the scene is analyzed at the hub to determine both the user head position and a face unit vector looking straight out from a user's face. The head position is identified in the skeletal model. The face unit vector may be determined by defining a plane of the user's face from the skeletal model, and taking a vector perpendicular to that plane. This plane may be identified by determining a position of a user's eyes, nose, mouth, ears or other facial features. The face unit vector may be used to define the user's head orientation and, in examples, may be considered the center of the FOV for the user. The face unit vector may also or alternatively be identified from the camera image data returned from the cameras 112 on head mounted display device 2. In particular, based on what the cameras 112 on head mounted display device 2 see, the associated processing unit 4 and/or hub 12 is able to determine the face unit vector representing a user's head orientation.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from capture device 20, the cameras on the head mounted display device 2 for the subject user and/or from the head mounted display device(s) 2 of other users.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the hub may further consider the position of the user's eyes in his head. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's FOV is also useful for determining what a user cannot see. As explained below, limiting processing of virtual objects to those areas that a particular user can see improves processing speed and reduces latency.

In the embodiment described above, the hub 12 calculates the FOV of the one or more users in the scene. In further embodiments, the processing unit 4 for a user may share in this task. For example, once user head position and eye orientation are estimated, this information may be sent to the processing unit which can update the position, orientation, etc. based on more recent data as to head position (from IMU 132) and eye position (from eye tracking assembly 134).

Returning now to FIG. 12, in step 618 the hub 12 may determine user movement and positions of virtual objects including HUD 460. For example, the hub 12 may determine how long a user has been looking in a particular direction, including toward or away from the HUD 460, and the hub may position the HUD 460 accordingly. Further details of step 618 are set forth in the flowchart of FIG. 14.

In step 714, the hub may determine whether the user is looking at the predefined position where the HUD is located for a predetermined period of time which in embodiments may be between 1 and 5 seconds, and for example 3 seconds, though it may be shorter or longer than this in further embodiments. If the user is not looking in the direction of the HUD 460 for the predetermined period of time, the HUD 460 may remain body locked in step 716 as described above.

On the other hand, if the user is looking in the direction of the HUD 460 for the predetermined period of time, the HUD 460 may switch to being a world locked virtual object in step 720 at its current location in three-dimensional space. As noted above, a user may thereafter move around and view the HUD 460 from different perspectives.

In step 724, the hub 12 determines whether a user looks away from the HUD 464 a predetermined period of time. In embodiments, this predetermined period of time may be between 1 and 5 seconds, and for example 3 seconds, though it may be shorter or longer than this in further embodiments. If the user does not look away from the HUD 460 for the predetermined period of time, the HUD 460 may remain world locked in step 720 as described above.

On the other hand, if the user looks away from the HUD 460 for the predetermined period of time, the HUD 460 may move back to the default body locked position for the HUD 460 in step 730, for example in front of the user and above horizontal. Thereafter, the HUD 460 may remain body locked in step 716 until the system again determines that the user is looking in the direction of the HUD 460 for the predetermined period of time in step 714.

As noted above, a user may select one or more virtual objects for interaction, such as for example the HUD 460. Selection of the HUD 460 or other virtual objects may be indicated by any of several gestures, such as for example the user having pointed at one or more virtual objects. When a user has selected the HUD 460, a user may interact with the content of the HUD 460, for example getting more detailed information on an item of content or altering an item of content. Once selected, the one or more virtual objects may remain selected, until the user performs another gesture indicating de-selection of one or more virtual objects. A de-selection gesture may for example be a physical hand gesture or the user looking away from the one or more virtual objects for a predetermined period of time.

The user may also grab and move virtual objects such as the HUD 460 from their default positions to new positions in the FOV. These new positions may be set as the new default positions, or the positions may revert back to the former default positions after the user de-selects the virtual object.

Figure 14:
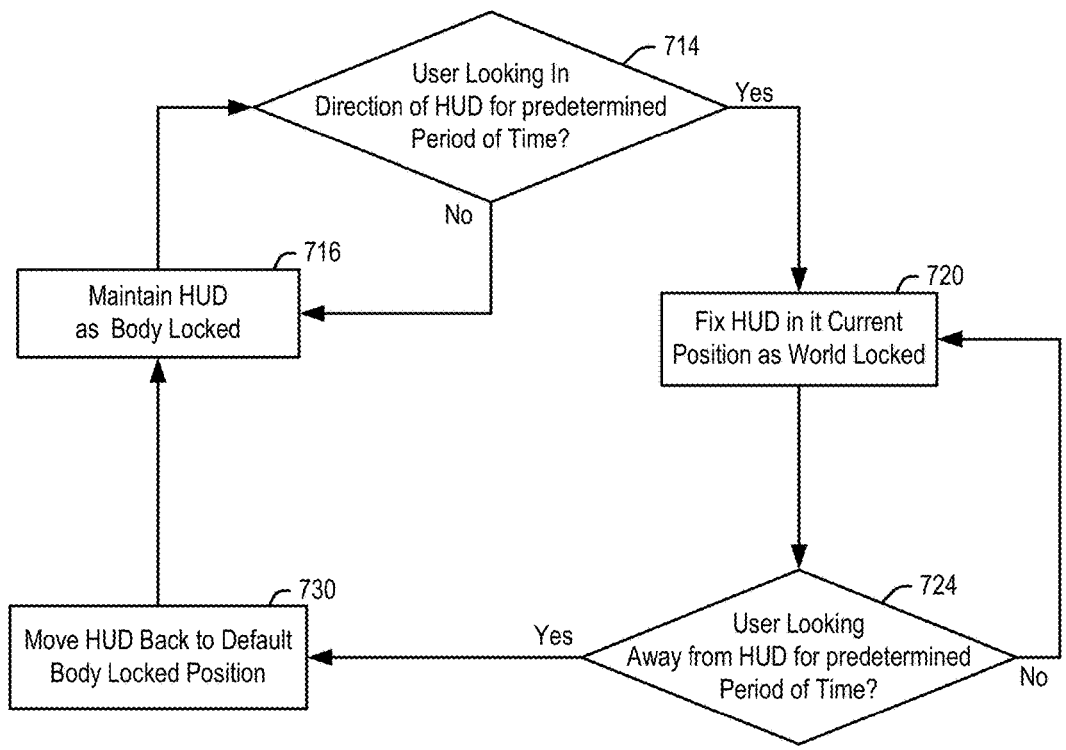

Once the positions of virtual objects including the HUD 460 are set as described in FIG. 14, the hub 12 may transmit the determined information to the one or more processing units 4 in step 626 (FIG. 12). The information transmitted in step 626 includes transmission of the scene map to the processing units 4 of all users. The transmitted information may further include transmission of the determined FOV of each head mounted display device 2 to the processing units 4 of the respective head mounted display devices 2. The transmitted information may further include transmission of virtual object characteristics, including the determined position, orientation, shape and appearance.

The processing steps 600 through 626 are described above by way of example. It is understood that one or more of these steps may be omitted in further embodiments, the steps may be performed in differing order, or additional steps may be added. The processing steps 604 through 618 may be computationally expensive but the powerful hub 12 may perform these steps several times in a 60 Hertz frame. In further embodiments, one or more of the steps 604 through 618 may alternatively or additionally be performed by one or more of the processing units 4. Moreover, while FIG. 12 shows determination of various parameters, and then transmission of these parameters all at once in step 626, it is understood that determined parameters may be sent to the processing unit(s) 4 asynchronously as soon as they are determined.

The operation of the processing unit 4 and head mounted display device 2 will now be explained with reference to steps 630 through 658. The following description is of a single processing unit 4 and head mounted display device 2. However, the following description may apply to each processing unit 4 and display device 2 in the system.

As noted above, in an initial step 656, the head mounted display device 2 generates image and IMU data, which is sent to the hub 12 via the processing unit 4 in step 630. While the hub 12 is processing the image data, the processing unit 4 is also processing the image data, as well as performing steps in preparation for rendering an image.

In step 634, the processing unit 4 may cull the rendering operations so that just those virtual objects which could possibly appear within the final FOV of the head mounted display device 2 are rendered. The positions of other virtual objects, such as body locked HUD 460, may still be tracked, but they are not rendered. It is also conceivable that, in further embodiments, step 634 may be skipped altogether and the whole image is rendered.

The processing unit 4 may next perform a rendering setup step 638 where setup rendering operations are performed using the scene map and FOV received in step 626. Once virtual object data is received, the processing unit may perform rendering setup operations in step 638 for the virtual objects which are to be rendered in the FOV. The setup rendering operations in step 638 may include common rendering tasks associated with the virtual object(s) to be displayed in the final FOV. These rendering tasks may include for example, shadow map generation, lighting, and animation. In embodiments, the rendering setup step 638 may further include a compilation of likely draw information such as vertex buffers, textures and states for virtual objects to be displayed in the predicted final FOV.

Referring again to FIG. 12, using the information received from the hub 12 in step 626, the processing unit 4 may next determine occlusions and shading in the user's FOV in step 644. In particular, the screen map has x, y and z positions of all objects in the scene, including moving and non-moving objects and the virtual objects. Knowing the location of a user and their line of sight to objects in the FOV, the processing unit 4 may then determine whether a virtual object partially or fully occludes the user's view of a real world object. Additionally, the processing unit 4 may determine whether a real world object partially or fully occludes the user's view of a virtual object. Occlusions are user-specific. A virtual object may block or be blocked in the view of a first user, but not a second user. Accordingly, occlusion determinations may be performed in the processing unit 4 of each user. However, it is understood that occlusion determinations may additionally or alternatively be performed by the hub 12.

In step 646, the GPU 322 of processing unit 4 may next render an image to be displayed to the user. Portions of the rendering operations may have already been performed in the rendering setup step 638 and periodically updated. Further details of step 646 are described U.S. Patent Publication No. 2012/0105473, entitled, "Low-Latency Fusing of Virtual And Real Content."

In step 650, the processing unit 4 checks whether it is time to send a rendered image to the head mounted display device 2, or whether there is still time for further refinement of the image using more recent position feedback data from the hub 12 and/or head mounted display device 2. In a system using a 60 Hertz frame refresh rate, a single frame may be about 16 ms.

If it is time to display the frame in step 650, the composite image is sent to microdisplay 120. At this time, the control data for the opacity filter is also transmitted from processing unit 4 to head mounted display device 2 to control opacity filter 114. The head mounted display may then display the image to the user in step 658.

On the other hand, where it is not yet time to send a frame of image data to be displayed in step 650, the processing unit may loop back for more updated data to further refine the predictions of the final FOV and the final positions of objects in the FOV. In particular, if there is still time in step 650, the processing unit 4 may return to step 608 to get more recent sensor data from the hub 12, and may return to step 656 to get more recent sensor data from the head mounted display device 2.

The processing steps 630 through 652 are described above by way of example. It is understood that one or more of these steps may be omitted in further embodiments, the steps may be performed in differing order, or additional steps may be added.

Moreover, the flowchart of the processing unit steps in FIG. 12 shows all data from the hub 12 and head mounted display device 2 being cyclically provided to the processing unit 4 at the single step 634. However, it is understood that the processing unit 4 may receive data updates from the different sensors of the hub 12 and head mounted display device 2 asynchronously at different times. The head mounted display device 2 provides image data from cameras 112 and inertial data from IMU 132. Sampling of data from these sensors may occur at different rates and may be sent to the processing unit 4 at different times. Similarly, processed data from the hub 12 may be sent to the processing unit 4 at a time and with a periodicity that is different than data from both the cameras 112 and IMU 132. In general, the processing unit 4 may asynchronously receive updated data multiple times from the hub 12 and head mounted display device 2 during a frame. As the processing unit cycles through its steps, it uses the most recent data it has received when extrapolating the final predictions of FOV and object positions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A system for presenting a mixed reality experience to one or more users, the system comprising:
   a display device including a display unit for displaying a virtual object; and
   a computing system operatively coupled to the display device, the computing system configured to:
      generate the virtual object for display on the display device,
      determine whether a field of view of the display device includes the virtual object for at least a determined period of time,
      position, based on determining that the field of view does not include the virtual object for at least the determined period of time, the virtual object as being body locked with respect to the display device, and
      position, based on determining that the field of view includes the virtual object for at least the determined period of time, the virtual object as being world locked.

2. The system of claim 1, wherein the computing system comprises at least one of a hub computing system or one or more processing units.

3. The system of claim 1, wherein the computing system is configured to switch the position of the virtual object from being body locked to being world locked in response to determining that the virtual object remains within the field of view of the display device for the determined period of time.

4. The system of claim 1, wherein the computing system is configured to switch the position of the virtual object from being world locked to being body locked in response to determining that the virtual object remains outside of the field of view of the display device for the determined period of time.

5. The system of claim 1, wherein the computing system is configured to switch the position of the virtual object from being world locked to being body locked in response to determining that the user is not looking in a direction of the virtual object.

6. The system of claim 1, wherein the virtual object is a heads-up display (HUD) including content.

7. The system of claim 1, wherein the computing system is configured to allow a user to select the virtual object when the virtual object is world locked, and move the virtual object to a new position in three dimensional space with a gesture.

8. The system of claim 7, wherein the virtual object is selected by the user performing a gesture with the user's hands, body or eyes.

9. A system for presenting a mixed reality experience, the system comprising:
   a display device including a first set of sensors for sensing data relating to a position of the display device and a display unit for displaying a virtual object to a user of the display device; and
   a computing system operatively coupled to the display device, the computing system including a second set of sensors for sensing data relating to a position of the user, and the computing system configured to:
     generate the virtual object for display on the display device,
     determine whether a field of view of the display device includes the virtual object for at least a determined period of time,
     maintain the virtual object in a body locked position outside of the field of view of the display device in response to determining that the field of view does not include the virtual object for at least the determined period of time, and
     maintain the virtual object in world locked position within the field of view of the display device in response to determining that the field of view includes the virtual object for at least the determined period of time.

10. The system of claim 9, wherein a user may view the virtual object from different perspectives and positions when the virtual object is world locked.

11. The system of claim 9, wherein the virtual object is body locked by remaining a fixed distance away from the user's head as the user moves around.

12. The system of claim 9, wherein the virtual object is body locked by remaining in front of a user's head and above a horizontal plane in which the user's head resides.

13. The system of claim 9, wherein the virtual object is body locked by pivoting with the user's head as the user's head turns from side to side.

14. The system of claim 9, wherein the virtual object is body locked by pivoting with the user's head as the user's head nods up and down.

15. The system of claim 9, wherein the virtual object is body locked by pivoting with the user's head as the user's head tilts from side to side.

16. The system of claim 9, wherein the virtual object is a first virtual object, the system further including a second virtual object, the computing system further configured to:
   maintain the second virtual object in a body locked position outside of the field of view of the display device in response to determining that the field of view does not include the virtual object for at least the determined period of time, and
   maintain the second virtual object in world locked position within the field of view of the display device in response to determining that the field of view includes the virtual object for at least the determined period of time.

17. A method of presenting a mixed reality experience to one or more users, the method comprising:
   determining whether a field of view of a display device includes a virtual object for at least a determined period of time,
     locking a position of the virtual object in a fixed position with respect to a portion of a user's body in response to determining that the field of view does not include the virtual object for at least the determined period of time; and
   locking a position of the virtual object in a fixed position in three-dimensional space in response to determining that the field of view includes the virtual object for at least the determined period of time.

18. The method of claim 17, wherein locking the position of the virtual object comprises locking the position of the virtual object with respect to the user's head.

19. The method of claim 17, further comprising switching the virtual object from the body locked position to the world locked position upon determining that the field of view includes the virtual object for at least the determined period of time.

20. The method of claim 17, further comprising switching the virtual object from the world locked position to the body locked position upon determining that the field of view does not include the virtual object for at least the determined period of time.

21. A system for presenting a mixed reality experience to a user, the system comprising:
   a display device including a display unit for displaying a virtual object; and
   a processor operatively coupled to the display device, the processor configured to:
     generate the virtual object for display on the display device,
     determine whether a field of view of the display device includes the virtual object for at least a determined period of time,
     operate, in response to determining that the field of view does not include the virtual object for at least a determined period of time, a first mode of operation where the virtual object is positioned outside of a central portion of a field of view of the display device, the virtual object moving with a body part of the user other than a head of the user so as to remain accessible to the user as the user moves, and such that the user can look toward and away from the virtual object in the first mode of operation,
     operate, in response to determining that the field of view includes the virtual object for at least a determined period of time, in a second mode of operation where the virtual object is world locked and the user can move around a fixed position of the virtual object, and
     switch from the first mode to the second mode by focusing on the virtual object in the first mode for a predetermined period of time.

22. The system of claim 21, wherein the the processor is further configured to switch the position of the virtual object from being world locked to being body locked in response to determining that the field of view does not include the virtual object for at least a determined period of time.

23. The system of claim 21, wherein the the processor is further configured to switch the position of the virtual object from being world locked to being body locked in response to determining that the user is not looking in a direction of the virtual object.

24. The system of claim 21, wherein the virtual object is a heads-up display (HUD) including content.

25. The system of claim 21, wherein the processor is further configured to allow a user to select the virtual object in response to the virtual object being world locked, and to move the virtual object to a new position in three dimensional space with a gesture.

* * * * *